United States Patent [19]

Luxem

[11] 4,083,200
[45] Apr. 11, 1978

[54] SLUSH FREEZER

[75] Inventor: Paul L. Luxem, Kiel, Wis.

[73] Assignee: Stoelting Brothers Company, Kiel, Wis.

[21] Appl. No.: 707,571

[22] Filed: Jul. 22, 1976

[51] Int. Cl.² ............................................. A23G 9/00
[52] U.S. Cl. ........................................ 62/342; 62/392; 366/286
[58] Field of Search ................. 62/136, 342, 343, 392; 259/DIG. 34, 108

[56] References Cited

U.S. PATENT DOCUMENTS

| | | | |
|---|---|---|---|
| 2,608,833 | 9/1952 | Woodruff | 62/342 X |
| 3,069,866 | 12/1962 | Dunn | 62/136 |
| 3,180,110 | 4/1965 | Dunn | 62/343 |
| 3,319,436 | 5/1967 | Wilch | 62/392 X |
| 3,698,203 | 10/1972 | Stoelting | 62/136 |

Primary Examiner—William F. O'Dea
Assistant Examiner—William E. Tapolcai, Jr.
Attorney, Agent, or Firm—Joseph P. House, Jr.

[57] ABSTRACT

Slush freezing apparatus with an upper liquid reservoir provided with a rotary agitator above the divider plate between the upper liquid reservoir and lower freezing chamber. The agitator stirs the liquid in the reservoir, thus redissolving ice which forms in the reservoir or which migrates into the reservoir from the freezing chamber. This action keeps the reservoir free of ice. A sealing ring above the divider plate has a contractible loop which interrupts the continuity of the ring and leaves a gap therein. This gap is disposed above the inlet to the dispensing spigot from the freezing chamber, thus to channel flow of liquid from the reservoir to the freezing chamber to the vicinity of the spigot inlet and flush the inlet with liquid from the reservoir and inhibit ice formation over the inlet.

4 Claims, 3 Drawing Figures

U.S. Patent        April 11, 1978        4,083,200
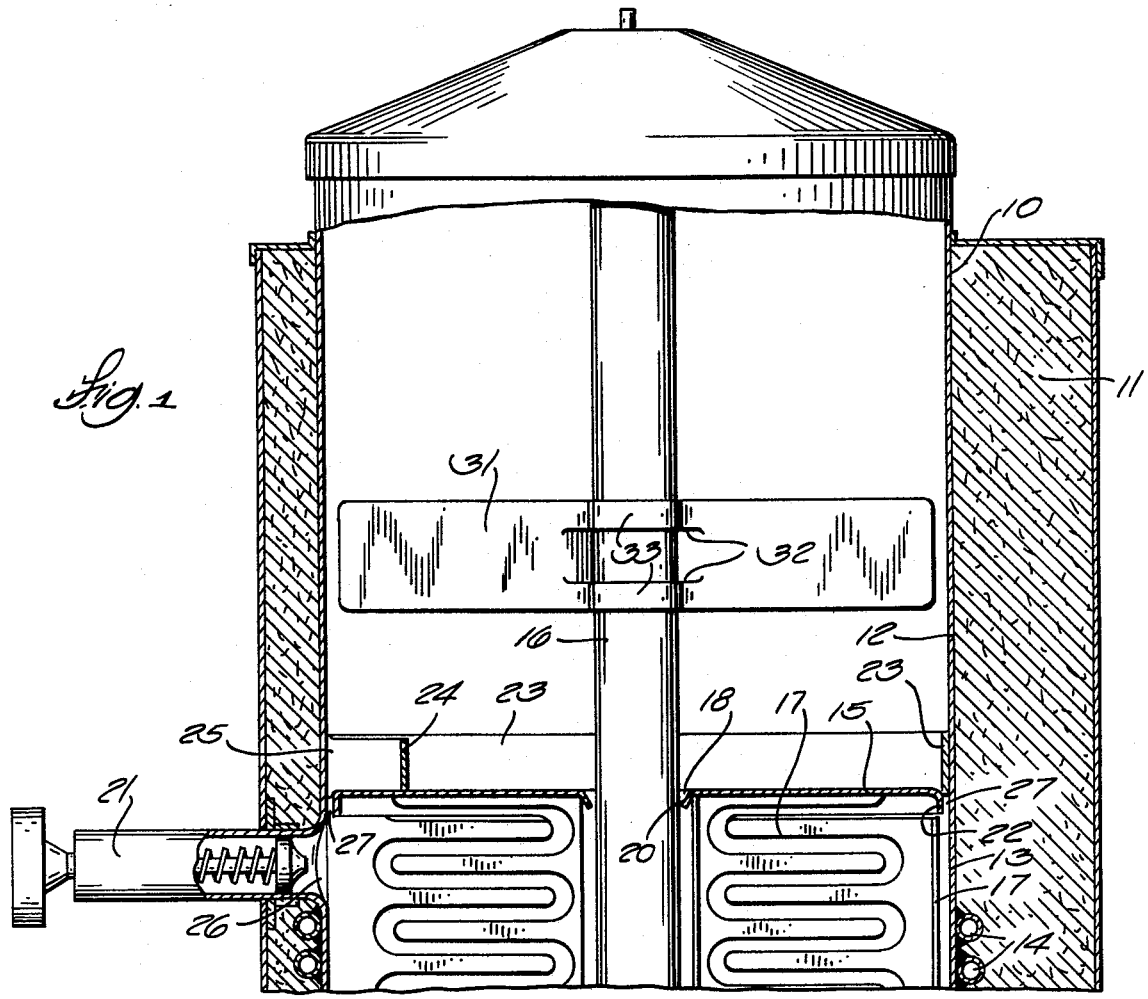
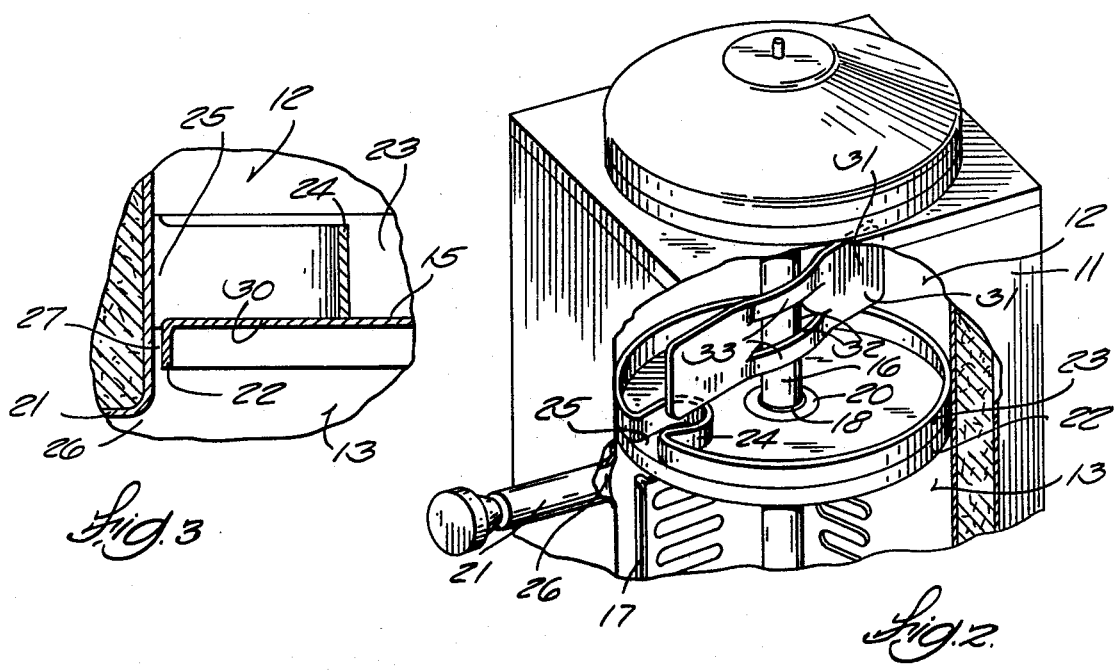

SLUSH FREEZER

BACKGROUND OF THE INVENTION

Slush freezing apparatus as shown, for example, in U.S. Pat. Nos. 3,698,203; 3,180,110 and 3,069,866, is subject to the problem of formation of ice in the upper liquid reservoir, either because of ice which forms on the upper surface of the chilled divider plate or which migrates upwardly through passage means which provides for flow of liquid from the reservoir to the freezing chamber. Formation of such ice may block flow of liquid from the reservoir to the freezing chamber and render the apparatus inoperative.

SUMMARY OF THE INVENTION

In accordance with the present invention, any ice which tends to form in the liquid reservoir or which migrates upwardly from the freezing chamber into the reservoir is redissolved into the warmer liquid in the reservoir by an agitator which is attached to the rotatable shaft which extends through the reservoir and which typically also actuates stirring and scraping paddles in the freezing chamber.

The inlet to the dispensing spigot from the freezing chamber is also flushed with warmer liquid from the liquid reservoir by providing a gap in the sealing ring above the divider plate. Accordingly, liquid flowing from the reservoir into the freezing chamber is flushed past said inlet to inhibit ice formation over the inlet and prevent blockage thereof. In the preferred embodiment, this gap is provided by a contractible loop in the ring which is present in the ring to maintain resilient pressure of the ring on the tank wall. Said loop is positioned directly above the spigot inlet to channelize flow from the reservoir past the periphery of the divider plate and into the vicinity of the inlet.

Other objects, features and advantages of the present invention will appear from the disclosure hereof.

DESCRIPTION OF THE DRAWINGS

FIG. 1 is a fragmentary cross section taken through slush freezing apparatus embodying the invention.

FIG. 2 is a fragmentary perspective view of the apparatus shown in FIG. 1, the insulated jacket of the apparatus being broken away to expose internal details.

FIG. 3 is a fragmentary enlarged cross section similar to FIG. 1, but showing in enlarged detail the structure of the parts adjacent the spigot inlet.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The disclosure of said U.S. Pat. No. 3,698,203 is incorporated herein by reference. This disclosure illustrates the cover-all structure of the slush freezing apparatus. The disclosure hereof will be limited to the features of this improvement invention.

A cylindrical tank 10 is housed in an insulated jacket 11. Tank 10 comprises an upper cylindrical liquid reservoir 12 and a lower freezing chamber 13, the wall of which is encircled by the coils 14 of evaporator section of a refrigerator. The reservoir 12 and freezing chamber 13 are separated by a divider plate 15. Vertically disposed on the central axis of the tank 10 is an agitator shaft 16 to which agitator and scraper blades 17 in the freezing chamber 13 are attached.

The divider plate 15 comprises an annular disk having a central opening about the shaft 16 to permit the shaft to turn with respect to the plate 15. At said opening, the plate 15 is provided with a downturned flange 20, the inner periphery of which is spaced somewhat from the shaft 16 to provide an annular gap 18 which provides passage means through the plate 15 between the reservoir 12 and the freezing chamber 13. Liquid such as water in the reservoir 12 will flow through said passage means 18 to resupply chamber 13 with liquid to make up the slush ice dispensed from the chamber 13 through the dispensing spigot 21.

The outer periphery of divider plate 15 is typically also provided with a downturned flange 22 which is also spaced slightly from the walls 12, 13 of the tank 10. This spacing also provides an annular gap 27 or passage means for flow of liquid between the two chambers 12, 13, except that this gap 27 is normally sealed by a sealing ring 23 which is resiliently biased into pressure contact with the wall 12 and the edge of which seats into the gap 27 between the flange 22 and the tank wall. Sealing ring 23 typically comprises a band of spring metal. The band is desirably looped inwardly at 24 and the loop exerts outward spring pressure on the ring to press it against the tank wall. By squeezing the loop together, the periphery of the ring can be shortened, to faciliate placement and removal of the ring with respect to the tank. Loop 24 interrupts the continuity of the ring 23, leaving a gap 25 in the ring 23.

In accordance with the present invention, the ring gap 25 is positioned directly above the inlet 26 to spigot 21 in the wall of the freezing chamber 13. Accordingly, liquid can flow from the liquid reservoir 12 through the gap 25 and through the spacing or gap 27 between the divider plate 15 and the wall of the tank. This liquid flows past the spigot inlet 26, this to flush the inlet 26 with such liquid and inhibit formation of ice across the inlet 26 which might otherwise block flow of slush through the spigot 21. Note especially from FIG. 3 that the height of the ring 23 where it is formed into loop 24 is reduced so that the lower edge 30 of loop 24 is above the lower edge of the ring 23. Accordingly, the lower edge of ring 23 can seat into the space or gap 27 between the flange 22 of the divider plate 15 and the tank wall to perform its sealing function, except in the vicinity of the loop gap 25. Accordingly, the elevated lower edge 30 of the loop 24 may rest in contact on the divider plate 15 and still permit the lower edge of the ring 23 to seat into the gap 27.

Shaft 16 is provided in reservoir 12 with an agitator comprising paddle 31. In the preferred embodiment, paddle 31 comprises a plastic strip having slits 32 which bands 33 can be sprung in opposite directions from the plane of the blade to embrace opposite sides of the shaft 16 and be frictionally bound thereto. Paddle 31 is desirably disposed three or four inches above the divider plate 15. Paddle 31 turns with the rotatable shaft 16 and at the same speed as the stirring and ice scraper blades 17 in chamber 13. Paddle 31 agitates and stirs the liquid in the liquid reservoir 12.

The refrigerating coils 14 maintain the slush in chamber 13 at a temperature ranging from 28° F. to 30° F. The liquid in chamber 12 is above 32° F. but is subject to freezing in the vicinity of the chilled plate 15, the temperature of which may drop below the freezing point because of its contact with the slush in chamber 13. If ice develops on the upper surface of plate 15, such ice may bridge across the passage means at 18 and 27 and prevent replenishment of liquid to chamber 13 from the reservoir. Moreover, ice crystals formed in chamber 13 may float or otherwise migrate upwardly from chamber 13 into reservoir 12 through the gaps 18 and 7. Such ice crystals as float upwardly into the reservoir 12 may freeze together and also cause blockage of flow of liquid from reservoir 12 into freezing chamber 13.

The paddle 31 rotates with shaft 16 at a relatively low speed, for example, 16 rpm, and will agitate the liquid in reservoir 12 to redissolve any such ice which forms in or migrates into reservoir 12, thus to keep the reservoir 12 clear of ice and to keep the passageways 18, 27 free of ice. Moreover, the paddle 31 coacts with the gap 25 in the sealing ring 23 to agitate the liquid of the reservoir to keep it free of ice and insure flushing action of the said liquid through the gaps 25, 27 and into the vicinity of the spigot inlet 26, thus to keep the spigot free of ice blockage.

What is claimed is:

1. Slush freezing apparatus having an upper liquid reservoir, a lower slush freezing chamber, a divider plate therebetween, passage forming means through the divider plate, and an agitator in said liquid reservoir for stirring the liquid therein, said freezing chamber having a dispensing spigot with its inlet adjacent the divider plate, a sealer ring adjacent the divider plate, said ring having a gap which interrupts its continuity, said gap being disposed adjacent the spigot inlet to channel flow of liquid from the reservoir to the freezing chamber into the vicinity of said inlet to flush said inlet with liquid from the reservoir and inhibit ice formation over said inlet.

2. The apparatus of claim 1 in which said ring has a loop which extends inwardly to form said gap in the ring.

3. The apparatus of claim 2 in which the divider plate has an outer periphery spaced from the wall of the chamber to form a gap therebetween, said ring having an edge which seats into said gap, 4. The apparatus of claim 3 in which the loop has a lower edge elevated above the lower edge of the ring, thus to permit the lower edge of the ring to seat into said gap without interference by said loop.

* * * * *